April 6, 1965 E. T. NORD ETAL 3,176,719
FOUR-WAY AIR VALVE
Filed Feb. 8, 1962 2 Sheets-Sheet 1

INVENTOR.
ERIC T. NORD
SAMUEL R. ROSEN
BY
ATTORNEYS 3,176,719
FOUR-WAY AIR VALVE
Eric T. Nord, Oberlin, and Samuel R. Rosen, Lorain, Ohio, assignors to Nordson Corporation, Amherst, Ohio, a corporation of Ohio
Filed Feb. 8, 1962, Ser. No. 171,941
8 Claims. (Cl. 137—625.27)

This invention relates to pneumatic motors and particularly to the valve mechanism for controlling the inlet and exhaust of air to and from the opposite sides of the piston of a single cylinder, double acting air motor. Such a valve is called, and will in this specification be called, a four-way air valve.

The general problem in the art to which our invention pertains is that of admitting air to and exhausting air from a pneumatic motor, particularly a double acting motor, with a minimum resistance to the flow of air to and from the cylinder of the motor and with leak-proof reversal of the flow of air at the end of each stroke of the piston whereby to maintain as nearly as practicable a continuous, true and reversing thrust output from the piston without deleterious dimimution as its speed and load is increased to a reasonably desirable maximum.

Within this general problem is a more specific problem which has been solved by our invention; namely, the prevention of the formation of ice at, around and adjacent the exhaust ports of the four-way valve due to the presence of water vapor in the air and the abrupt drop in pressure at the exhaust ports. While our invention is especially concerned with air valves for air motors for this reason, its utility and advantages are not confined to the employment of moisture-laden air. We shall refer to air, however, as illustrative of all fluids which may be employed in fluid motors controlled by our valve advantageously because, as we presently believe, moisture-laden air is illustrative of a, if not the, most difficult fluid or compressible fluid to handle within present commercially practicable and desirable limits. We have employed our invention advantageously for the control of air motors for operating pumps for pumping paint or hot paint in the so-called Hot Airless method of spray painting, see U.S. Patents Nos. 2,754,228 and 2,763,575. In this method the paint, whether hot or cold, is projected from a small orifice nozzle under high pressure, and the continuity of an even pressure is most desirable, if not quite necessary, to the best employment of the method.

The exhaust passages of an air motor are subjected to extremely low temperatures as the compressed air is exhausted to atmosphere. When the motor is operating at ordinary room temperatures and humidities, and at relatively low speeds and/or low air pressures, there is an opportunity for ambient heat to travel through the mechanism and prevent the exhaust passages from freezing. As the operating speed and/or pressure is increased, or as the ambient temperature is decreased, the point is soon reached where such heat transfer is inadequate and the exhaust air will reduce the temperature of the mechanism to well below the freezing point. The moisture in the compressed air then freezes on and in the exhaust air ports and passages and renders the air motor inoperative. The temperature of the exhaust air at any point is a function of the pressure drop. The actual relationship of temperature to pressure drop in this kind of a device is something between the isothermal and the adiabatic relationship. As the air motor speed and pressure are increased and the ambient temperature is lowered, the expansion more closely approximates an adiabatic type. The greater the pressure drop between two points, the greater the temperature drop between these two points. The air valve usually contains the points and places of maximum pressure drop and this, combined with the fact that the moving and sealing parts of the valve are most vulnerable to ice, make the valve the most likely source of trouble.

Experience shows that for normal operation at ordinary room temperature and humidity, the temperature recorded by a thermometer immediately beyond the exhaust port is sub-zero, Farenheit. In other words, no external operator or attached muffler could be used because the impinging moist air would freeze on them and form ice which would quickly block the exhaust port and passage.

We have discovered that freezing in a pneumatic motor air valve can be eliminated or much reduced if the entire or much of the pressure drop, and/or the icing consequence thereof, can be caused to take place beyond the extreme external physical part of the exhaust port and structure. In practice the ideal may not quite be achieved, but it is possible with our invention to approximate this ideal in practicable form and structure and with substantial elimination of all deleterious icing and the undesirable consequences thereof.

It is, therefore, among the objects of our invention to solve the problems stated and discussed, and provide practicable ways and means for so doing.

It is, therefore, also among the objects of our invention to provide a four-way valve for an air motor having a minimum pressure drop across both the inlet and exhaust passages and ports and having large free ports and short smooth fluid passages conducive of non-turbulent fluid flow. Another object is to provide for quick reversal of the ports and passages in such a valve in respect to the motor and the flow of fluid thereto and therefrom. Another object is to minimize and/or eliminate icing in such a valve as well as to provide for the breaking and clearing of any ice formation about such a valve without stalling the motor and without damage to the valve or the motor. A more particular object is to provide a location for the necessary pressure drop to atmosphere conducive to the elimination of icing and in aid of the other of the above stated objects.

Another object is to provide such a valve that will be responsive to a minimum signal, and will move with rapid acceleration from one extreme position to another in response to a modest force and motion. Another object is to provide in, and in respect to such a valve that it shall have a positive reversal and shall be substantially devoid of tendency or necessity to stall in a dead center position. Another object is to provide such a valve in simple efficient form, free from the need of adjustments, easily maintained, easily repaired and assembled in the field, rugged in construction and economical to make and maintain.

The foregoing and other objects and advantages of our invention will more fully and at large appear from the following description of a preferred form and exemplification of our invention, reference being had to the accompanying drawings, in which.

Figure 1:
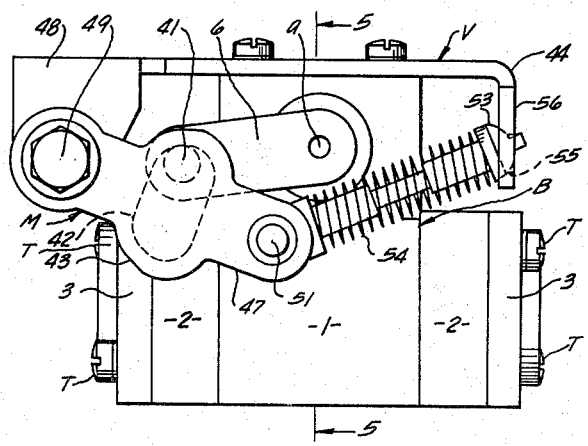
FIGURE 1 is a side elevation of our valve and snap-action actuating mechanism.
Figure 2:
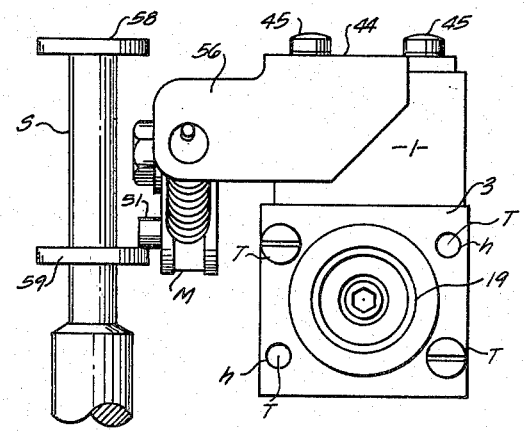
FIGURE 2 is an end elevation of our valve taken from the right end, as viewed in FIG. 1, and showing also the upper end of an external actuating shaft, not shown in FIG. 1.
Figure 3:
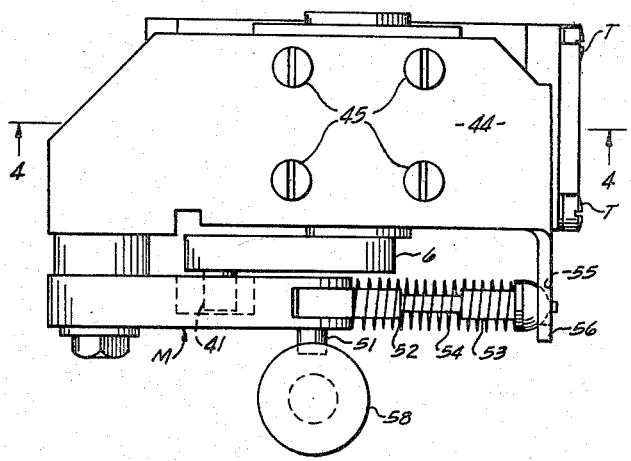
FIGURE 3 is a top plan view of our valve and external actuating mechanism and means shown in FIG. 2.
Figure 4:
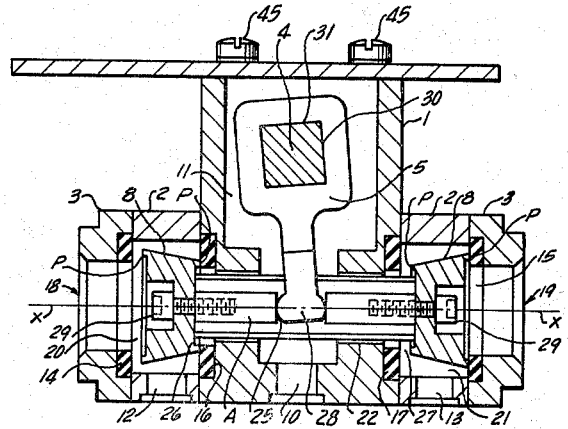
FIGURE 4 is a median longitudinal vertical sectional view taken in the plane of the axis of the valve ports and of the line 4—4 of FIG. 3.

In this preferred form of our invention our valve V comprises a multi-piece body B, FIGS. 1–5, with a central part 1, laterally disposed valve chamber housings 2, FIGS. 1 and 4, and exhaust valve seat carriers and ports 3, FIGS. 1, 2 and 4. Our valve also comprises the assembly A of valve stem 7 and dual closures 8 carried at the opposite ends thereof, FIGS. 4, 6 and 7, the actuating shaft 4 and levers 5 and 6, FIGS. 1, 4 and 5, and the snap-action mechanism M, FIGS. 1, 2 and 3. An external reciprocating shaft S serves as the ultimate valve actuator and, for the purpose of this description, it may be assumed that the shaft S is so connected to the piston of a double acting air or other compressible fluid motor, not shown, that the reciprocation of the shaft S will activate the snap mechanism M at the correct instant whenever the piston approaches one end of its stroke where it is desired to reverse its motion by exhausting air under pressure from one side of the piston and from the "full" side of the cylinder, and, simultaneously, to introduce air under pressure to the other; the same, and the prompt execution thereof, comprising, inter alia, one of the offices, functions and advantages of our invention.

In our valve, FIG. 4, the motive fluid, which is ordinarily and economically, free, compressed, atmospheric, water-vapor laden air, is led to our valve V through the main intake port 10 in the base of the body part 1 to the high pressure chamber 11 comprising the hollow interior of the body, and compressed air from the chamber 11 is delivered to the controlled motor from our valve alternately through one of the delivery ports 12 and 13, and, simultaneously, exhausted from the motor through the other of said delivery ports according to the position of the valve assembly A in relation to the exhaust valve seats 14 and 15 and inlet valve seats 16 and 17. As also shown in FIG. 4, the valve closure member 8 at the right end of the assembly A, as viewed, is engaging the exhaust valve seat 15 of the exhaust port 19 and is spaced from the inlet valve seat 17 whereby to open communication from the high pressure chamber 11 to the working side of the piston in the fluid motor through the port 13. The closure member 8 at the left, meanwhile is engaging the inlet seat 16 and is spaced from the exhaust seat 14 whereby to open communication from the exhausting side of the piston of the motor through the delivery port 12 to atmosphere through the leftward exhaust port 18. When the lever 5 forces the valve stem closure assembly A leftwardly as viewed in FIG. 4 to reverse the situation from that shown in FIG. 4, closing the leftward exhaust and the rightward intake openings, and opening the rightward exhaust and the leftward intake openings, the flow through the delivery ports 12 and 13 will be reversed, and the opposite side of the piston of the fluid motor will be caused to become the working side whereby to induce the desired reversal of pneumatic force exerted on the piston.

The exhaust ports 18 and 19 comprise the seats 14 and 15 and the outwardly opening and expanding passages therebeyond in the exhaust seat carriers 3 so that nothing about our valve impedes or is disposed in the stream of the flow of exhaust gases at or beyond the exhaust valve seats and/or where icing tends to occur and tends to be induced by contact with almost any tangible thing. Moreover, the shape and disposition of the seats and closures tends to constrict the flow of gases through the ports toward the axis X thereof and away from contact with the surface of the seat cariers beyond the seats. The exhaust ports 18 and 19 are preferably identical and circular in configuration and disposed symmetrically about the axis X along which the assembly A has its reciprocating motion and as to which all the valve seats and the seat engaging portions of the closures 8 are axially and co-axially aligned. Preferably the seats 14–17 take the form of rectangular washers made of durable and slightly yielding material to accommodate our desired simultaneous seating of oppositely disposed intake and exhaust closures. Tough rubber-like materials such as neoprene and butyl rubber have qualities which we prefer. The yielding of the exhaust valve seats under the impact of the closures thereupon promotes the breaking loose of any ice that might otherwise impair the exhaust valves.

Figure 6:
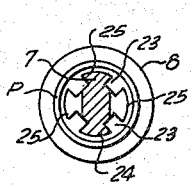
FIGURE 6 is an elevation of the assembly of valve stem and closure members.
Figure 7:
FIGURE 7 is a transverse section taken in the plane of the line 7—7 of FIG. 6.

Each of the closure members 8, see also FIGS. 6 and 7, has a smooth, rounded exterior form, conveniently and preferably of a truncated cone, to aid the free uninhibited flow and movement of gas thereabout within the respective valve chambers 20 and 21 within which the closure members have their reciprocating motion between the respectively juxtaposed pairs of intake and exhaust valve seats 14–16 and 15–17. Each of the closure members also has oppositely facing, peripherally disposed, narrow, annular, seat-engaging, smooth, raised portions P of limited radial extent assuring high unit sealing pressure between the closures and the seats to make and maintain fluid tight seals therebetween in the seated condition thereof.

As is also shown in FIGS. 4 and 6, the closure members 8 in their truncated conical external form with the sealing annuli P peripherally disposed on the opposite faces thereof, afford greater effective sealing areas with the exhaust seats 14 and 15 than with the intake seats 16 and 17. In the condition shown in FIG. 4 the high fluid pressure in the chambers 11 and 21 acts on the differential area between the lesser effective closure area against the inlet seat 16 and the greater effective closure area against the exhaust seat 15, and therefore compels the stem and closure assembly A to be urged rightwardly and maintain the exhaust port 19 closed and maintain the inlet passage 27 across the seat 17 to the delivery port 13 open whilst the exhaust port 18 and the delivery port 12 are open to atmosphere, and the inlet passage 26 across seat 16 is closed. For convenience, we shall call the fluid passageways adjacent the seats 16 and 17 the inlet ports or passages 26 and 27 respectively, and as we have done or suggested in the preceding part of this specification we may refer to the big ends of the closures 8 in coaction with the exhaust seats 14 and 15 as exhaust valves and refer to the smaller ends of the closures 8 in their coaction with the inlet seats 16 and 17 as inlet valves.

When the valve assembly A has been moved leftwardly to bring about the opposite condition from that shown in FIG. 4, the same differential area, assuming the closures 8 are identically formed as we prefer, will hold the assembly A in the leftward and opposite position. It follows that the force of the motive fluid pressure acting on this differential area must first be overcome before the assembly A can be moved from either extreme position to the other. In the interest of rapid acceleration of the assembly A and the rapid reversal of the pressure on the piston in the controlled motor, the initial force, or blow, required to move the assembly will be greater than the force required to continue and accelerate such motion after the closed exhaust and inlet valves are "cracked." Moreover, when the assembly A has been accelerated from one position and approaches the end of its travel toward the other, and the "other" exhaust valve is rapidly closing, the fluid pressure acting on the "other" differential area as it becomes effective in the new direction will augment the mechanical force acting to slam the said other exhaust and inlet valves closed.

Figure 5:
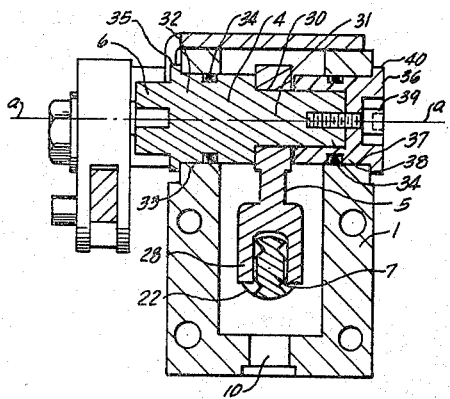
FIGURE 5 is a transverse vertical sectional view taken in the plane of the axis, the shaft of the actuating levers and of the line 5—5 of FIG. 1.

The body part 1 has a lateral bore 22, FIGS. 4 and 5, with its axis coincident with the axis X, within which the fluted valve stem 7 has a free but closely guided sliding fit whereby to carry the closures 8 in true axial alignment with the axis X and for a square seating between the seats 14–17 and the raised rings P, all positioned normal to the axis. The flutes 23 in the stem 7 are shown in FIGS. 6 and 7 and are spaced between ribs 24 to afford free passage for compressed motive fluid from the chamber 11 through the inlet ports 26 and 27, FIG. 4, to the valve chambers 21, 22. The external cylindrical surfaces of the ribs 24 slide in the bore 22 as mentioned above, and each of the two ribs on the sides of the stem 7 have a mid-portion cut away to receive the lower, rounded, bifurcated ends 28 of the lever 5, FIGS. 4 and 5, between, opposed bearing faces 25 of the cut-away ribs, FIGS. 6 and 7. The rounded ends 28 have a wide, smooth, free fit and bearing between the face 25 for driving engagement therewith and for transmission of the large forces intended to give high acceleration to the assembly A.

The closures 8, FIGS. 4 and 6, are removably secured to the opposite ends of the stem 7 by cap screws 29 passing through central apertures in the closures and engaging tapped holes in the stem. We prefer that the remote faces of the closures be recessed sufficiently to receive the whole of the heads of the screws 29, and remove them from the fluid exhaust stream in the exhaust ports to obviate icing thereupon. Shims, not shown, may be interposed around the screws 29 and between the ends of the stem 7 and the proximate faces of the closures 8 to adjust the axial spacing of the simultaneously seating annuli P of the closures 8 on the pairs 15, 16 and 14, 17 respectively of the valve seats, but we prefer to provide lapped metal to metal face contact between the ends of the stem 7 and the proximate faces of the closures 8 and avoid shims for the sake of enduring accuracy, simplified field assembly and positive fluid tightness between the closures and the stem.

Similarly, while sealing gaskets and/or shims, not specifically shown, may be interposed between the housing members 2 and the sides of the body 1 and between the housing members 2 and the seat carriers 3 to seal the valve chambers 20 and 21 against leakage and also to determine and/or adjust the spacings between the intake and the exhaust seats in each valve chamber, we also prefer to lap these joints for similar reasons. Tie bolts or screws T engaging alternate tapped holes h at diagonally opposite corners of the carriers 3, see FIGS. 1 and 2, secure the several constituents of the whole of the body B in aligned fluid-tight engagement with each other on lapped metal to metal contacting faces as we prefer.

Turning now more especially to the mechanism for actuating our valve: As shown in FIGS. 4 and 5, the lever 5 is non-rotatably supported on a transverse shaft 4, for swinging movement about the axis a thereof, having a non-circular opening 30 encompassing a non-circular, preferably square, shank 31 of the shaft and snugly and slideably removably engaging the same. Leftwardly, as viewed in FIG. 5, of the shank 31 the shaft takes cylindrical form and comprises a journal part 32 rotatably supported in the smooth bearing 33 bored in the wall of the body 1; the journal part 32 having an annular groove with an O-ring 34 to seal compressed air within the chamber 11 of the body while permitting free rotation of the journal 32 in its bearing 33. The journal part 32 of the shaft preferably has an annular rib 35 locating the shaft axially and preferably also has the external lever 6, see also FIGS. 1 and 3, formed integrally therewith and, for convenience, extending horizontally and at approximately right angles to the substantially vertical disposition of the internal lever 5. Rightwardly, as viewed in FIG. 5, the shaft 4, as a composite whole, comprises a thimble 36 which is externally equal to the journal 32, and is closely and rotatably supported in a bearing-borne 37 corresponding to the bearing 33 in the body 1 and has another O-ring seal 34 like the seal for the journal 32. Internally the thimble 36 receives the reduced end 38 of an integral extension of the shaft 4 which is small enough to permit the upper end of the lever 5 to be slipped thereover for assembly, and which is tapped to receive the screw 39 which removably secures the thimble to the end of the shaft. This permits assembly of the parts on the one hand, and provides an integral functional relationship between the opposite ends of the shaft in the aligned bearings 33 and 37 in which the shaft is borne for oscillatory rotation. An external flange or rib 40 on the thimble lying adjacent the outer surface of the body locates the shaft 4 axially in collaboration with the oppositely disposed rib 35 at the other end of the shaft.

The actuating mechanism also comprises a top plate and cover 44 which, FIGS. 4 and 5, serves among other things, to close the upper end of the chamber 11 in the central body part 1 with a proper sealing gasket between the cover and the upper open end of body part, and being tightly secured thereupon and thereto by screws 45, see also FIG. 3, the ends of which, not shown, threadably engage tapped holes in the body part 1. In addition to closing the hollow interior of the body part 1, plate 44 carries the snap actuating mechanism M which is positioned to overlie the actuating lever 6 and have violent motivating contact with the pin 41, FIGS. 1 and 3, which is integrally formed with and extends frontwardly (FIGS. 1–3) away from the actuating lever 6; the pin 41 extending into a slotted recess 42 in the enlarged mid-portion 43 of rigid toggle lever 47 of the toggle mechanism M. The toggle lever 47 at its left end (as viewed in FIGS. 1 and 3) is pivotally connected at 49 to and supported by the forwardly disposed and downwardly extending, leftward end 48 of the plate 44, and the lever 47 is pivotally connected at its rightward end to and by the toggle pin 51 to the axially telescoping leg 52–53 of the toggle which lies within and is resiliently extended by the coil spring 54. Preferably, the left end 52 of the leg 52–53 has a bifurcated terminal removable and pivotally engaging the toggle pin 51, and the rightward end 53 has its rightward terminal end externally rounded for pivotally seated engagement with the apertured socket 55 in the forwardly offset, depending end 56 of the plate 44. As shown in FIGS. 2 and 3, the toggle pin 51 is engaged, or engageable, alternately by upper and lower discs 58 and 59 on and adjacent the end of the actuating shaft S; the discs being spaced axially of the shaft sufficiently to permit the pin 51 to be "snapped-over" freely by one disc without interfering contact with the other.

In operation with the parts positioned as shown in FIGS. 1 and 4, upward motion of the shaft S, which indicates the approach of the piston of the controlled motor to the upward end of its stroke, engages disc 59 with the toggle pin 51 and forces the pin upwardly, compressing the spring 54, as admitted by the telescoping parts of the leg 52, 53, and swinging the rigid toggle lever 47 counterclockwise as viewed in FIG. 1 about its pivot 49. Such initial motion of the toggle pin 51 upwardly as viewed in FIGS. 1 and 2 is not communicated to the pin 41 of the lever 6 by virtue of the freedom of the pin 41 in the elongated slot or recess 42 whilst, however, the lower end of the slot 42 is moved to proximity with the pin 41 as upward, counterclockwise motion of the toggle lever 47 continues. When the toggle pin 51 has been moved to alignment between the end pivot points 49 and 55 the closed lower end of the recess 42 will have approached the pin 41 and will promptly and forcibly engage the pin 41 when the toggle pin 51 passes over the center line connecting the axes of the pivot points 49 and 55. Thereupon the spring 54 snaps the toggle pin 51 upwardly as far as motion of the levers 6 and 5 and the assembly A will permit; the pin 41 then engaging the lower end of the slot 42 and restraining the toggle from further motion and transmitting the force of the spring 54 to the valve seats through the closures 8. In that condition the toggle pin 51 will lie in its uppermost position proximate to but not in contact with the disc 58 where it will be engaged by the disc 58 and moved downwardly when the piston of the controlled motor approaches the lower end of its stroke and initiates that downward motion of the shaft S which will snap the toggle mechanism back to the position shown in FIG. 1 and "snap" the assembly A back to the position shown in FIG. 4.

This operation of the actuating mechanism with its so called snap or brisk motion of the assembly A will produce the valving operations and results with the delivery of compressed air to and exhaust thereof from the controlled motor as hereinabove more fully described and with the advantages to which we have alluded and will have become apparent to those skilled in the art.

While we have illustrated and described a preferred form of our invention, changes, modifications and improvements will occur to those skilled in the art who come to understand and enjoy the practice thereof and the teaching of this specification. Therefore, we do not care to be limited in the scope of our patent to the literal forms and examples of our invention herein specifically illustrated and described, nor limited in any way inconsistent with the progress of the art which has been promoted by our invention.

We claim:

1. A four-way valve for an air motor having pairs of intake and exhaust valves oppositely spaced along a common axis and comprising
    a body having an interior chamber with a pressure fluid supply passage communicating with a source of compressed air, and having inlet ports for said inlet valves between said chamber and said motor with inlet valve seats aligned on said axis,
    said body also having a pair of oppositely disposed, externally situated, exhaust ports for said exhaust valves remote from said chamber with exhaust valve seats at the inner ends of said ports aligned on said axis adjacent and juxtaposed respectively to said inlet valve seats, said exhaust ports being communicable with said motor through said exhaust valves and being wholly open to the atmosphere and unobstructed beyond said valve seats,
    a movable valve stem aligned on said axis,
    pairs of oppositely facing, juxtaposed valve closure members carried on opposite ends of said valve stem between said juxtaposed seats respectively and aligned on said axis and simultaneously and selectively engaging an intake seat at one end of said stem and with an exhaust seat at the other end of said stem,
    means removed from said exhaust ports for slidably supporting said valve stem for reciprocation on said axis, and
    means removed from said exhaust ports for moving said valve stem and said closure members along said axis for selective engagement with said seats.

2. The valve of claim 1 in which said exhaust ports extend beyond said exhaust valve seats for a distance less than the least diameter of said seats.

3. The valve of claim 2 in which the interiors of said exhaust ports are smooth and cylindrical and of no smaller cross-sectional area than the least area of said exhaust valve seats.

4. The valve of claim 3 wherein no substantial part of a closure member protrudes into an exhaust port.

5. The valve of claim 1 wherein the interior surfaces of said exhaust ports are round and are smooth and provide passages of no greater restriction than the least restriction of said exhaust valves when open.

6. The valve of claim 1 wherein no substantial part of a valve closure member protrudes into the stream of exhaust gas flowing from an exhaust valve.

7. The valve of claim 6 in which the exhaust ports lying beyond said exhaust valve seats are shorter than the diameter of said seats.

8. The valve of claim 1 in which no substantial part of any closure member extends into an exhaust port, and said exhaust ports are round and smooth and offer less resistance to the flow of exhaust gases therethrough than the passage across said exhaust valve seats when the exhaust valves are open.

References Cited by the Examiner

UNITED STATES PATENTS

| 829,120 | 8/06 | Mumford | 137—625.25 |
| 928,459 | 7/09 | Kieselhorst | 251—75 |
| 1,263,107 | 4/18 | Quinn | 137—625.27 |
| 1,295,638 | 2/19 | Triggs | 251—75 |
| 1,357,960 | 11/20 | Cruse | 251—75 XR |
| 1,879,415 | 9/32 | Mutrux et al. | 251—75 |
| 1,921,092 | 8/33 | Newton | 121—46.5 |
| 2,952,246 | 9/60 | Collins | 121—46.5 |

FOREIGN PATENTS 718,532  11/54  Great Britain.

M. CARY NELSON, *Primary Examiner.*

KARL J. ALBRECHT, MILTON KAUFMAN,
*Examiner.*